Figure 1:
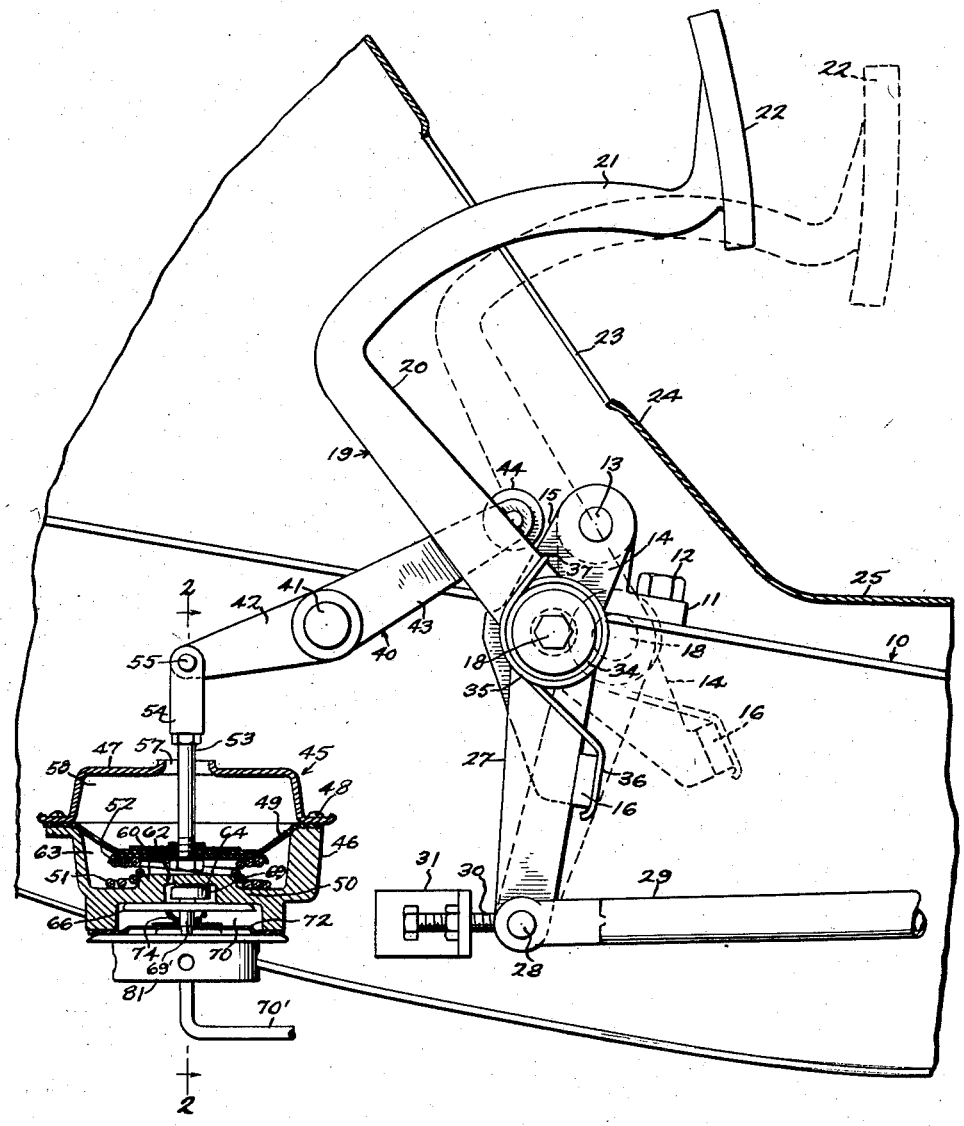

Aug. 26, 1958  D. T. AYERS, JR  2,848,980
MOTOR FOR POSITIONING A BRAKE PEDAL
Filed Oct. 19, 1953  2 Sheets-Sheet 1

INVENTOR
DAVID T. AYERS JR.
BY John F. Phillips
ATTORNEY

Aug. 26, 1958  D. T. AYERS, JR  2,848,980
MOTOR FOR POSITIONING A BRAKE PEDAL
Filed Oct. 19, 1953  2 Sheets-Sheet 2

INVENTOR
DAVID T. AYERS JR.
BY John V. Phillips
ATTORNEY

United States Patent Office

2,848,980
MOTOR FOR POSITIONING A BRAKE PEDAL

David T. Ayers, Jr., Birmingham, Mich., assignor to Kelsey-Hayes Company, a corporation of Delaware Application October 19, 1953, Serial No. 386,944

6 Claims. (Cl. 121—38)

This invention relates to a brake operating mechanism for motor vehicles.

In the co-pending application of Jeannot G. Ingres, Serial No. 372,109, filed August 3, 1953, having an assignee common to this application, there is disclosed an automatic mechanism for changing the position of a brake pedal associated with the booster brake mechanism to provide a low pedal with a low-leverage ratio under normal operating conditions and to raise the pedal and increase the leverage ratio of the pedal in the event of a failure of power in the booster motor, thus facilitating foot operation of the brakes.

Low pedal brakes are highly desirable and have come into common use for the operation of booster brake mechanisms where the booster motor performs a substantial part of the work in applying the vehicle brakes. Such a low pedal is highly convenient in operation, since it is quite easy to transfer the operator's foot from the accelerator pedal to the brake pedal without having to raise the foot. However, in the event of a failure of power, or if the vehicle is drifting without the engine running, very substantial force is required for the manual operation of the brakes. It is highly desirable, therefore, to provide means for elevating the brake pedal and increasing the leverage ratio to facilitate foot operation of the brakes when necessary.

In the co-pending application referred to, a novel and simplified type of two-position brake pedal is shown together with means for controlling the position of the pedal. Such means comprises a small fluid pressure motor deriving its power from the same source as the booster motor so as to be operative whenever the booster motor is operative to hold the brake pedal in a normally low position. The motor which controls the position of the pedal is biased for operation to move the brake pedal to a higher position and change the leverage ratio thereof whenever the source of power fails. While the construction is fully operative and highly practicable, it has a disadvantage in that operation of the pedal-positioning motor takes place too rapidly when the pedal is moved to a low position, resulting in objectionable noise in operation.

An important object of the present invention is to provide, in combination with a two-position brake pedal, a novel control motor of such type that operation of the motor to move the pedal to a normally low position is retarded to eliminate objectionably noisy operation of the parts.

A further object is to provide such a device wherein a biasing spring tends to move the pressure-responsive device of the control motor to a high brake position upon a failure of power in the motor, and which operation is permitted to take place relatively rapidly upon a failure of power for controlling the motor.

A further object is to provide such a device having a control valve which, in one position, freely opens the control motor to the atmosphere for the free and rapid movement of the parts to a high brake pedal position and which functions when motor operating power becomes available for retarding the establishment of differential pressures in the control motor, thus retarding movement of the brake pedal to low position and eliminating objectionable noise.

Other objects and advantages of the invention will become apparent during the course of the following description.

Figures 2, 3:
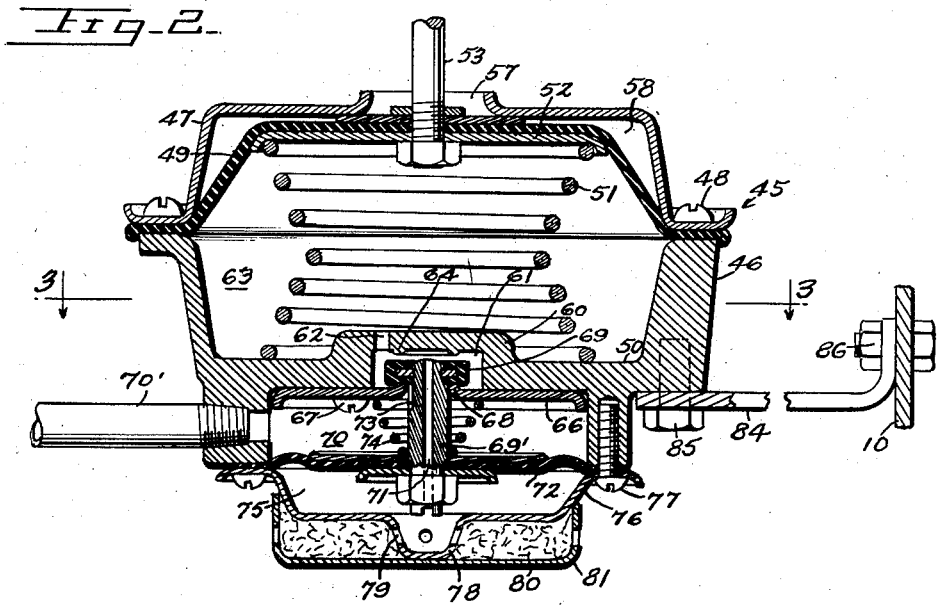

In the drawings I have shown one embodiment of the invention. In this showing:

Figure 1 is a side elevation of the operating parts of the pedal mechanism for the braking system, together with associated parts, the brake pedal being shown in low position in solid lines and in a higher position in dotted lines, Figure 2 is an enlarged sectional view on line 2—2 of Figure 1, parts being broken away, and Figure 3 is a section on line 3—3 of Figure 2.

Referring to Figure 1 a portion of the vehicle frame is illustrated and is indicated by the numeral 10. A bearing 11 is bolted or otherwise secured as at 12 to the top of the frame and supports a shaft 13 to which is secured a control member, specifically a depending arm 14 having a cam surface 15 on one edge thereof. The lower end of the arm 14 is provided with a lateral projection 16 for a purpose to be described.

To the arm 14 is pivotally connected as at 18 a pedal lever indicated as a whole by the numeral 19. This lever is provided with an upper end 20 extending rearwardly in an arcuate portion 21 terminating in a pedal pad 22. The lever portion 21 projects through the usual opening 23 in the vehicle toe board 24 formed at the forward extremity of the floor board 25 in the usual manner.

The pedal lever 19 further includes a lower arm 27 pivotally connected as at 28 to a pedal-operated rod 29 extending in the usual manner into a brake booster mechanism, the rod 29 being biased forwardly by the usual return spring means (not shown). Forward movement of the rod 29 and the lower end of the lever arm 27 is limited by an adjustable stop screw 30 carried by a stationary bracket 31.

The pedal lever 19 is provided with a hub portion 34 through which the pivot pin 18 extends. This hub is surrounded by a torsion spring 35 having a lower end 36 arranged rearwardly of and engaging the lateral projection 16. The spring 35 has its upper end 37 engaging the lever arm 20 rearwardly thereof. This torsion spring, therefore, exerts forces against the lever 19 to tend to turn the latter counterclockwise and against the arm 14 to tend to turn it clockwise about the shaft 13. The spring 35, therefore, tends to maintain the lateral projection 16 seated against the rear edge of the lever arm 27, in which case, the pedal arm 21 and pad 22 occupy the solid line positions shown in Figure 1. It will be apparent that when the pedal pad is depressed from such position, the bearing of the lever arm 27 against the projection 16 causes the lever members 14 and 19 to rock together as a unit on the axis of the shaft 13. This is the normal operation of the device when power is present in the booster motor.

A lever or operating member 40 is pivotally supported intermediate its ends by a shaft 41 supported in any suitable manner by the frame 10. The lever 40 is provided with a forward lever arm 42 and a rear lever arm 43, the latter of which carries a roller 44 normally occupying the position shown in Figure 1 slightly out of engagement with the cam edge 15.

The parts described above correspond with the disclosure of the co-pending application referred to, and form per se no part of the present invention. In the co-pending application, a simple vacuum motor is employed for transmitting forces to the free end of the lever arm 42. This lever arm is swung downwardly to the position shown in Figure 1 when power for the booster motor is available, and is spring-biased upwardly upon a failure in such power to swing the lever 40 clockwise. Thereupon, the roller 44 engages the cam edge 15 to swing the lever 14 on the shaft 13 to the dotted line position shown. This moves the pivot pin 18 rearwardly while the pin 28 remains stationary, and the pedal pad 22 is moved to the dotted line position shown in Figure 1. The pedal is then positioned for foot operation.

The present invention provides a novel type of motor, shown in the present instance as a vacuum motor, for controlling the position of the parts as described above. This motor is shown in Figure 1 and is shown in detail in Figures 2 and 3. Referring particularly to Figure 2, the motor is indicated as a whole by the numeral 45 and comprises a lower, preferably die cast housing 46 and an upper, preferably stamped housing member 47. The peripheral portions of these housings are secured together by screws 48 with the peripheral portion of a flexible diaphragm 49 interposed therebetween. The casing section 46 is provided with a bottom wall 50. A compression spring 51 seats at its lower end against the wall 50 and at its upper end against a plate 52 secured to the central portion of the diaphragm. Such portion of the diaphragm and the plate 52 are fixed to a rod or actuating member 53, the upper end of which (Figure 1) is secured to the lower end of a yoke 54 pivoted as at 55 to the free end of the lever arm 42. Centrally thereof, the casing section 47 is provided with a relatively large opening 57. This opening communicates with the atmosphere to maintain atmospheric pressure present in the upper chamber 58 of the motor and is of such size as to accommodate lateral components of movement of the rod 53 incident to swinging movement of the pivot pin 55 about the axis of the shaft 41.

The bottom wall 50 of the motor is provided with a raised central portion 60 provided therewithin with a chamber 61 communicating through a port 62 with the lower chamber 63 of the motor 45. An annular valve seat 64 is formed in the top of the chamber 61.

Against the bottom wall 50 a plate 66 is secured by screws or the like 67. The plate 66 has its central portion provided with an opening and the material of the plate is turned upwardly to form a valve seat 68. A resilient valve 69 is provided with upper and lower face portions respectively engageable with the seats 64 and 68. This valve is adapted to control communication between the chamber 61 and a chamber 70 beneath the plate 66. This chamber 70 is in fixed communication with a suitable source of vacuum through a pipe 70'.

The valve 69 is carried by a stem 69' having an axial passage 71 therethrough. The lower end of the stem 69' is carried by a diaphragm 72 forming the bottom of the chamber 70. The stem 69' is provided in one side thereof below the valve 69 with a small longitudinal groove 73 adapted to afford restrictive communication between chambers 61 and 70 under conditions to be described. The diaphragm 72 is biased downwardly by a spring 74.

The passage 71 controls communication between the chamber 61 and a lower chamber 75 formed between the diaphragm 72 and a lower stamped cap 76 secured to the lower casing section 46 as at 77. The cap 76 is provided in the bottom thereof with an axial depression 78 communicating through ports 79 with a body of an aircleaning material 80 confined by an apertured housing 81 secured in position in any suitable manner, for example, by being spot welded to the bottom of the depression 78.

The motor 45 may be supported in position in any suitable manner. For example, a bracket 84 may be fixed as at 85 to the motor 46 and may be secured as at 86 to the vehicle frame 10.

OPERATION

Normal operation of the brake pedal takes place under conditions which will be apparent from the foregoing description. Assuming that the motor vehicle engine is running, air will be exhausted from the chamber 63 and atmospheric pressure will hold the diaphragm 49 in the lower position shown in Figure 1, because at the same time, vacuum will be present in the chamber 70 and atmospheric pressure beneath the diaphragm 72 will hold the valve 69 in engagement with the seat 64 which prevents communication of the chamber 63 with the atmosphere through passage 71.

Under such normal operating conditions, the roller 44 will remain out of engagement with the cam edge 15. Assuming that a failure occurs in the source of vacuum, pressure will quickly rise in the chamber 70 and the spring 74 will move the diaphragm 72 downwardly. The valve 69 will be disengaged from the seat 64 and air will flow through passage 71 into chamber 61, thence through port 62 through chamber 63. Atmospheric pressure will be quickly established in such chamber and the diaphragm 49 will be moved upwardly by the spring 51. The stem 53 moves upwardly to swing the lever 40 (Figure 1) in a clockwise direction, and the roller 44 will engage the cam edge 15 and swing the lever arm 14 to the dotted line position. The lower end of the lever arm 27 will remain in its normal position, but the pivot 18 will swing rearwardly with the lever 14 and the projection 16 of the latter will be moved away from the rear edge of the lever arm 27. The lever arm 14 will be held in such position by engagement of the roller 44 with the cam surface 15, the lower end of which curves forwardly as shown. In the dotted line positions of the parts, the cam edge 15 will be substantially vertical and a plane through the axes of the roller 44 and shaft 41 will be horizontal. Accordingly, the lever arm 14 will be blocked against movement away from the dotted line position shown in Figure 1.

The operation referred to above bodily swings the pedal lever 19 about the axis of the pin 28 and the pedal pad 22 assumes the dotted line position shown in Figure 1. Thereafter, depression of the pedal pad rocks the lever 19 about the axis of the pin 18, thus providing a brake pedal having a greater leverage ratio for the direct foot operation of the brakes.

It will be obvious that the parts will occupy the positions shown in Figure 2 when the vehicle engine is not running. Whenever the engine is started, the vacuum source will be provided for operating the booster brakes and for operating the motor 45. This vacuum is established very rapidly, and in the co-pending application referred to, the pedal control motor will be operated with extreme rapidity to release the brake pedal for movement to its lower position shown in solid lines in Figure 1. The rapidity of this operation causes objectionable noise in the operation of the device in the co-pending application whenever the motor is started. The same is true, of course, whenever power in the source is restored after having been lost.

The present device overcomes the objections referred to. Assuming that the engine is not running, the parts will be positioned as in Figure 2. When the engine is started, air will be exhausted from the chamber 70 and atmospheric pressure therebelow will almost instantly move the diaphragm 72 upwardly to engage the valve 69 with the seat 64. The chamber 61 and, consequently, the motor chamber 63, will be cut off from the atmosphere by the closing of the valve 69. The stem 69' substantially fits the opening through the valve seat 68, and this prevents substantial communication between chambers 61 and 70. Under such conditions, however, the small groove 73 will afford restricted communication between these chambers. Accordingly, air will be exhausted at a relatively retarded rate from the motor chamber 63 through port 62 into chamber 61 and thence through groove 73 into chamber 70 which is in full communication with the source of vacuum, for example, the intake manifold of the vehicle engine.

Leakage between the stem 69' and the opening through the valve seat 68 may be depended upon to provide the restricted exhausting of the chamber 63, in which case, the groove 73 may be eliminated. It is preferred, however, that a sliding fit be provided between the parts referred to to accurately guide the valve 69, and the groove 73 is provided for restricting the exhausting of air from the chamber 63. This exhaustion of air requires only a short space of time, but is relatively much slower than in a simple vacuum motor of the type shown in the co-pending application referred to. The movement is retarded only sufficiently to prevent the objectionably noisy operation referred to. The operation is not objectionably noisy in the movement of the pedal to the high position for foot operation, and it is desired that such operation take place rapidly in the event of a failure of power in the source for the booster motor. The present construction provides for such rapid operation. When the power fails, the valve 69 opens and the flow of air through the passage 71 takes place relatively rapidly and the diaphragm 49 moves quite rapidly to its upped limit of movement shown in Figure 2.

It is to be understood that the form of the invention shown and described is for the purpose of illustration and that the scope of the invention is defined in the appended claims.

I claim:

1. In a power device for controlling different speeds of movement of an operating member mounted to assume either of two positions, a differential fluid pressure operated motor having a pressure responsive member therein, an actuating member connected to said pressure responsive member for moving said operating member to one or the other of its said positions, means biasing said actuating member toward a first position for moving said operating member to one of said positions, and valve means having fluid connection with said motor, the atmosphere and a vacuum source and including portions operable to normally maintain differential force on said pressure responsive member to overcome said means biasing said actuating member and for establishing differential pressures in said motor at a restricted rate to move said actuating member to a second position for relocating said operating member to the other of its positions, said valve means comprising a valve element biased to move, when no vacuum is present in said source, to a position freely relieving said motor of differential pressure whereby said means biasing said actuating member toward a first position moves said actuating member to said one position.

2. In a power device for controlling the different speeds of movement of an operating member mounted to assume either of two positions, a differential fluid pressure operated motor having a pressure responsive member therein, an actuating member connected to said pressure responsive member for moving said operating member between said two positions, means biasing said actuating member toward a first position for moving said operating member to one of said positions, said pressure responsive member dividing said motor to provide a pair of chambers one of which is in fixed communication with the atmosphere, a conduit communicating with the source of vacuum, valve means connected for controlling communication between the other of said chambers and the atmosphere and said conduit, said valve means having two positions in one of which said other chamber is in unrestricted communication with the atmosphere and in the other of which said other chamber is disconnected from the atmosphere, said first position of said valve means permitting the means biasing said actuating member to position the same in its first position, said second position of said valve means providing a normal pressure differential on said pressure responsive member overcoming said means biasing said actuating member toward a first position and moving it to a second position, and a restricted passage formed by portions of said valve means and connecting said other chamber and said conduit when said valve means is in said other position.

3. In a power device for controlling different speeds of movement of an operating member mounted to assume either of two positions, a differential fluid pressure operated motor having a pressure responsive member therein, an actuating member connected to said pressure responsive member for effecting movement of said operating member between said two positions, means biasing said actuating member toward a first position for moving said operating member to one of said positions, said pressure responsive member dividing said motor to provide a pair of chambers one of which is in fixed communication with the atmosphere, a conduit communicating with a source of vacuum, valve means connected for controlling communication between the other of said chambers and the atmosphere and said conduit, said valve means having two positions in one of which said other chamber is in unrestricted communication with the atmosphere and said actuating member is in said first position and in the other of which said other chamber is disconnected from the atmosphere and a pressure differential exists between said pair of chambers overcoming said means biasing said actuating member, a restricted passage formed by said valve means communicating between said conduit and said other chamber when said valve means is in said other position, a control chamber connected to said conduit, a diaphragm forming one wall of said control chamber and connected to said valve means, and means biasing said valve means to its first-named position, said diaphragm having its side opposite said control chamber subject to atmospheric pressure to be moved thereby to move said valve means to its other position upon a predetermined change in pressure in said control chamber incident to a failure of said vacuum source.

4. In a power device for controlling the position of a control member mounted for movement by an operating lever to assume either of two positions and being biased to one of said positions, a vacuum motor having a pressure responsive member therein dividing it into a pair of chambers one of which communicates with the atmosphere, an actuating member connected to said pressure responsive member for engagement with said operating lever for moving said control member from its biased position to its other position, means connected for biasing said pressure responsive member in one direction to move said actuating member for operating said lever and moving said control member to said other position, a valve chamber adjacent the other chamber of said motor and having substantially unrestricted communication therewith, and valve means in said valve chamber connected to control communication between the other motor chamber and the atmosphere and a vacuum source, said valve means including portions being movable to one position to unrestrictedly connect said valve chamber to a second position establishing restricted communication between said other chamber of said motor and said vacuum source and normally maintaining a pressure differential on said pressure responsive member overcoming said means connected for biasing said pressure responsive member in said one direction.

5. In a power device for controlling the position of a control member mounted for movement by an operating lever to assume either of two positions and being biased to one of said positions, a vacuum motor having a pressure responsive member therein dividing it into a pair of chambers one of which communicates with the atmosphere, an actuating member connected to said pressure responsive member for engagement with said operating lever for moving said control member from its biased position to its other position, means connected for biasing said pressure responsive member in one direction to move said actuating member for operating said lever and moving said control member to said other position, a valve chamber adjacent the other chamber of said motor and having substantially unrestricted communication therewith, a valve in said valve chamber, a plate forming one wall of said valve chamber having at its opposite side a vacuum chamber, said plate being provided with a valve seat, the opposite side of said valve chamber having a second valve seat, a stem connected to said valve and projecting through said first-named valve seat and provided with an atmospheric passage therethrough, and means connected for effecting movement of said valve into engagement with either of said seats, said valve stem being grooved to afford restricted communication between said valve chamber and said vacuum chamber when said valve engages said second seat for normally providing a pressure differential on said pressure responsive member in said one direction, said atmospheric passage being closed to said valve chamber by said valve when the latter engages said second seat.

6. In a power device for controlling the position of a control member mounted for movement by an operating lever to assume either of two positions and being biased to one of said positions, a vacuum motor having a pressure responsive member therein dividing it into a pair of chambers one of which communicates with the atmosphere, an actuating member connected to said pressure responsive member for engagement with said operating lever for moving said control member from its biased position to its other position, means connected for biasing said pressure responsive member in one direction to move said actuating member for operating said lever and moving said control member to said other position, a valve chamber adjacent the other chamber of said motor and having substantially unrestricted communication therewith, a valve in said valve chamber, a plate forming one wall of said valve chamber having at its opposite side a vacuum chamber, said plate being provided with a valve seat, the opposite side of said valve chamber having a second valve seat, a stem connected to said valve and projecting through said first-named valve seat, a diaphragm connected to said valve stem, said diaphragm and said plate forming opposite walls of a vacuum chamber, said valve stem having an atmospheric passage connecting said valve chamber to the atmosphere when said valve engages said first-named seat, and a spring connected for biasing said valve into engagement with said first-named valve seat, the face of said diaphragm opposite said vacuum chamber being subject to atmospheric pressure whereby, when vacuum is present in said vacuum chamber, said diaphragm will move said valve into engagement with said second seat, said stem being grooved to afford restricted communication between said valve chamber and said vacuum chamber when said valve is in engagement with said second seat providing a pressure differential on said pressure responsive member for overcoming said means connected for biasing said pressure responsive member in said one direction.

References Cited in the file of this patent

UNITED STATES PATENTS

| | | |
|---|---|---|
| 2,037,869 | Wall | Apr. 21, 1936 |
| 2,265,546 | Price | Dec. 9, 1941 |
| 2,311,120 | Mossinghoff | Feb. 16, 1943 |
| 2,347,837 | Morrison | May 2, 1944 |
| 2,372,842 | Mossinghoff | Apr. 3, 1945 |
| 2,417,994 | Sheets | Mar. 25, 1947 |